(12) United States Patent
Hurley et al.

(10) Patent No.: US 9,976,047 B2
(45) Date of Patent: May 22, 2018

(54) ACRYLIC-URETHANE IPN PLASTISOL

(71) Applicant: PolyOne Corporation, Avon Lake, OH (US)

(72) Inventors: James M. Hurley, Atlanta, GA (US); Erik M. Saly, Kennesaw, GA (US); Yixin Yang, Smyrna, GA (US)

(73) Assignee: PolyOne Corporation, Avon Lake, OH (US)

( * ) Notice: Subject to any disclaimer, the term of this patent is extended or adjusted under 35 U.S.C. 154(b) by 268 days.

(21) Appl. No.: 14/900,418

(22) PCT Filed: Jun. 24, 2014

(86) PCT No.: PCT/US2014/043818
§ 371 (c)(1),
(2) Date: Dec. 21, 2015

(87) PCT Pub. No.: WO2014/209968
PCT Pub. Date: Dec. 31, 2014

(65) Prior Publication Data
US 2016/0152857 A1    Jun. 2, 2016

Related U.S. Application Data

(60) Provisional application No. 61/839,005, filed on Jun. 25, 2013.

(51) Int. Cl.

| | |
|---|---|
| B32B 3/10 | (2006.01) |
| C09D 133/06 | (2006.01) |
| C08J 3/02 | (2006.01) |
| C08G 18/80 | (2006.01) |
| C09D 175/04 | (2006.01) |
| C08G 18/32 | (2006.01) |
| C09D 11/102 | (2014.01) |
| C09D 11/107 | (2014.01) |
| C08F 299/06 | (2006.01) |
| C09D 151/08 | (2006.01) |
| C08J 3/00 | (2006.01) |
| C08J 3/20 | (2006.01) |
| C08K 5/00 | (2006.01) |
| C08K 5/25 | (2006.01) |

(52) U.S. Cl.
CPC ........ *C09D 133/06* (2013.01); *C08F 299/065* (2013.01); *C08G 18/3262* (2013.01); *C08G 18/80* (2013.01); *C08J 3/005* (2013.01); *C08J 3/02* (2013.01); *C08J 3/203* (2013.01); *C09D 11/102* (2013.01); *C09D 11/107* (2013.01); *C09D 151/08* (2013.01); *C09D 175/04* (2013.01); *C08G 2150/90* (2013.01); *C08G 2190/00* (2013.01); *C08G 2270/00* (2013.01); *C08J 2333/04* (2013.01); *C08J 2375/04* (2013.01); *C08J 2475/04* (2013.01); *C08K 5/0016* (2013.01); *C08K 5/25* (2013.01)

(58) Field of Classification Search
None
See application file for complete search history.

(56) References Cited

U.S. PATENT DOCUMENTS

| | | |
|---|---|---|
| 4,128,600 A | 12/1978 | Skinner et al. |
| 4,199,486 A | 4/1980 | Boessler et al. |
| 4,247,578 A | 1/1981 | Skinner et al. |
| 4,342,793 A | 8/1982 | Skinner et al. |
| 4,923,934 A | 5/1990 | Werner |
| 5,210,109 A | 5/1993 | Tateosian et al. |
| 5,324,762 A | 6/1994 | Overend et al. |
| 5,328,957 A | 7/1994 | Sorathia et al. |
| 5,648,432 A | 7/1997 | Pater et al. |
| 6,355,712 B1 | 3/2002 | Schultes et al. |
| 6,433,048 B2 | 8/2002 | Kasai |
| 6,559,193 B2 | 5/2003 | Nonoyama et al. |
| 6,809,147 B1 | 10/2004 | Ohno et al. |
| 6,916,869 B2 | 7/2005 | Eto et al. |
| 7,019,102 B2 | 3/2006 | Schoenfeld et al. |
| 7,332,539 B2 * | 2/2008 | Nakayama ............ C08G 18/10 524/251 |
| 7,851,561 B2 | 12/2010 | Kuntimaddi et al. |
| 7,888,448 B2 | 2/2011 | Kuntimaddi et al. |
| 8,039,541 B2 | 10/2011 | Mae |
| 8,497,023 B2 | 7/2013 | Myung et al. |
| 8,936,853 B2 | 1/2015 | Schattka et al. |
| 2006/0173110 A1 | 8/2006 | Baba |
| 2011/0111238 A1 * | 5/2011 | Schattka ............... C08F 220/34 428/463 |
| 2014/0135436 A1 | 5/2014 | Suzuki |

* cited by examiner

*Primary Examiner* — Christopher Polley
(74) *Attorney, Agent, or Firm* — John H. Hornickel; Maria M. Hoke

(57) ABSTRACT

Plastisol compositions having a two-resin interpenetrating polymer network (IPN) are disclosed. The compositions begin with blocked isocyanate grafted acrylic polymer, blocked isocyanate urethane prepolymer, plasticizer, optionally pigment, and optionally thixotropic agent. When subjected to a thermal cure, the isocyanate groups on the acrylic polymer and urethane prepolymer both become unblocked and both react with the crosslinking agent to form an interpenetrating acrylic-polyurethane network. The two-resin IPN offers improved storage stability, hand-feel characteristics, and processing properties for textile printing among other uses. Preferably these plastisol compositions are essentially free of polyvinyl halides and phthalates restricted for regulatory reasons.

20 Claims, No Drawings

ACRYLIC-URETHANE IPN PLASTISOL

CLAIM OF PRIORITY

This application claims priority from U.S. Provisional Patent Application Ser. No. 61/839,005 and filed on Jun. 25, 2013, which is incorporated by reference.

FIELD OF THE INVENTION

The present invention concerns plastisol compositions in which an acrylic resin system is crosslinked with a urethane resin system to form an acrylic-polyurethane interpenetrating polymer network (IPN). Due to the covalent bonds formed as a result of the crosslinking between the two polymer resin systems of this IPN, the plastisol demonstrates improved toughness and durability.

BACKGROUND OF THE INVENTION

Plastisols are suspensions of polymer particles in plasticizer that flow as a liquid for application and are then heated to form flexible plasticized product having a fixed shape. Plastisols are useful as a coating, binder, adhesive, sealant or protective layer in a wide variety of applications, including protective coatings for metal finishes, UV films for outdoor products, and automotive products (e.g. underbody coatings and interior coverings).

Plastisol compositions are also used as a textile ink for screen-printing applications forming graphics and other images on the textiles. Most common among these imaged textiles are T-shirts with images of famous entertainers, college names, witty sayings, etc.

The ink composition is a plastisol, because the means of application of the colorful liquid ink utilizes the fluid properties of the plastisol before heating and/or pressure causes the base resin in the plastisol to cure into a colorful solid on the surface of the textile.

Historically, most plastisols were a combination of polyvinyl chloride (PVC) resin particles dispersed in and swelled by phthalate-based plasticizers. However, due to environmental and health safety concerns, the composition of these inks is under increasing scrutiny. In particular, the Consumer Product Safety Improvement Act of 2008 and the European Community regulation on chemicals, Registration, Evaluation, Authorisation and Restriction of Chemical substances (EC 1907/2006), restrict the following phthalates in certain articles (hereinafter referred to as "restricted phthalates"): bis(2-ethylhexyl) phthalate (DEHP, DOP), dibutyl phthalate (DBP), benzyl butyl phthalate (BBP), diisononyl phthalate (DINP), diisodecyl phthalate (DIDP), and di(n-octyl) phthalate (DNOP).

The use of acrylic resins in place of PVC, which acrylics also do not use restricted phthalates, is especially attractive and has been extensively researched. Nonetheless, acrylic resin plastisol inks continue to have shorter storage stability, less desirable hand-feel characteristics of softness without tackiness, less toughness/durability and can be more difficult to process using the processes and techniques otherwise used for PVC plastisol, which continues to be prevalent in the industry.

To address some of the problems associated with acrylic-based plastisol resins, inventors of a number of patents and patent applications have proposed the use of acrylic core-shell polymers, namely: U.S. Pat. No. 4,199,486 (Boessler et al.); U.S. Pat. No. 5,324,762 (Overend et al.); U.S. Pat. No. 6,355,712 (Schultes et al.); U.S. Pat. No. 6,433,048 (Kasai); and US 2010/0069566 (Mae). These patents and published patent applications teach that a core-shell structure is effective in improving the storage stability of acrylic plastisol. Unfortunately, improvements in storage stability of the core-shell acrylic resins are usually accompanied by a decrease in certain physical properties significant to the use of acrylic resins as a plastisol resin, such as the toughness of the cured resin, which also affects its durability over time.

To address the poor strength, elongation and durability issues of plastisols made with acrylic polymer resins, several persons have described using interpenetrating polymer networks (IPNs) where a blocked isocyanate-functionalized urethane prepolymer is added to the acrylic plastisol to form a separate polyurethane or polyurea phase when the plastisol composition is cured. Examples of this approach are U.S. Pat. No. 6,916,869 Eto et al.; US 2006/0173110 (Baba); and U.S. Pat. No. 7,332,539 (Nakayama et al.), WO 2013/016265 (Suzuki), US 2005/282990 (Schoenfeld at al.), U.S. Pat. No. 6,809,147 (Ohno et al.), and U.S. Pat. No. 6,559,193 (Nonoyama et al.). These examples teach the crosslinking of only the polyurethane resin in the cured plastisol.

The addition of a polyurethane resin to the acrylic plastisol is recommended in the above patents and published applications, because polyurethanes generally have better toughness compared to acrylic polymers. However, in a plastisol having a two-resin system the acrylic polymer and polyurethane are predisposed to form separate domains due to their incompatibility, diminishing the toughness and durability of the plastisol.

Therefore, the industry still lacks a solution to the deficiencies of the various prior approaches to a non-PVC plastisol ink, which does not rely upon a restricted phthalate plasticizer and, which, in particular, meets all the requirements for screen-printing of textiles.

SUMMARY OF THE INVENTION

What the art needs is a plastisol ink that is essentially free of vinyl halide and restricted phthalate plasticizers, exhibits fast cure (i.e. 0.5-3 minutes at temperature between about 140° C. to about 170° C.), stores well for acceptable shelf life, has acceptable strength, and has a good hand-feel characteristic. "Essentially free" means that there is no intention to include any vinyl halide material or restricted phthalate plasticizer material in the plastisol ink compositions.

One aspect of the invention is plastisol compositions, comprising: (a) acrylic polymer; (b) urethane prepolymer; (c) plasticizer; (d) crosslinking agent; (e) optionally thixotropic agent; and (f) optionally pigment. Both of the acrylic polymer and urethane prepolymer contain blocked isocyanate groups that will become unblocked when subjected to heat and react with the crosslinking agent to form an interpenetrating acrylic-polyurethane network. Preferred are plastisol compositions that are essentially free of polyvinyl halides and restricted phthalates.

Preferably, the ratio of the acrylic polymer resin and the urethane prepolymer to the plasticizer has a range from about 2:1 to about 1:3, and more preferably a range from about 1:1 to about 1:3. The ratio of the acrylic polymer resin to the urethane prepolymer is, preferably, a range from about 1:1 to about 4:1.

Another aspect of the present invention is a method of making plastisol compositions by: (a) blending, into a mixture, blocked isocyanate grafted acrylic polymer, plasticizer, and optionally pigment together using a rotary mixer with jacketed cooling tub until the mixture is homogeneous; (b) de-agglomerating the mixture using a 3-roll mill, for a sufficient duration to ensure a Hegman fineness of grind value≥4; (c) adding crosslinking agent; and where urethane prepolymer with blocked isocyanate functional groups is added during step (a) or (c). A cured plastisol composition is then made by (d) heating the mixture to unblock the isocyanate groups on the acrylic polymer and the urethane prepolymer so that they will react with the crosslinking agent to form an interpenetrating acrylic-polyurethane network. Thixotropic agents may optionally be adding during step (a) and step (c) to achieve the desired viscosity target.

A feature of the present invention is the formation of an interpenetrating acrylic-polyurethane network with a modulus of toughness twice as high as the crosslinked acrylic composition alone. The present invention can be used as inks for placing, such as by screen-printing, graphics and other images on textiles.

Other aspects of the invention will become apparent from a description of the embodiments.

EMBODIMENTS OF THE INVENTION

Blocked-Isocyanate Grafted Acrylic Polymer

Any acrylic polymer having blocked isocyanate functional groups can be a candidate for use in the invention. Blocked isocyanates are substances in which all active isocyanate groups have been reacted with a blocking agent. At increased temperatures, the blocking agent is removed, and the highly reactive isocyanate group is exposed.

Preferred are core-shell acrylic polymers, because their shells can have a different chemical compatibility compared to their cores. This difference can be exploited to increase shelf life of the plastisol by selecting a plasticizer that is incompatible with the shell polymer resin, but is compatible with the core polymer resin.

Core-shell acrylic polymers having blocked isocyanate groups grafted to the polymer useful for the present invention are described in US 2011/0111238 (Shattka et al.), which is incorporated herein by reference. In Shattka et al., the acrylic polymer is functionalized with isocyanate groups to increase the adhesion of the acrylic polymer to other substrates, often metal or cathodically electrocoated sheet metal. However, in the present invention the blocked isocyanate groups on the acrylic polymer are specifically targeted to react with a crosslinking agent. The isocyanate content of the core-shell acrylic polymer is preferably about 0.02% to about 10.0% by weight, more preferably about 0.1% to about 5.0% by weight, with particular preference for about 1.0% to about 3.0% by weight. The isocyanate content here is to be calculated as the weight of the unprotected isocyanate groups (NCO, i.e. 42 g/mol) relative to the total weight of the acrylic core-shell polymer.

The number average molecular weight, $M_n$, of the core-shell acrylic polymer can range from about 300,000 to about 4,000,000 g/mol. The grains of the acrylic polymer resin consist of secondary particles in the range of about 5 μm to about 500 μm in diameter, preferably about 10 μm to about 200 μm in diameter and with a particular preference of about 20 μm to about 80 μm in diameter, which themselves are aggregates of primary particles of approximately 1 mm diameter. The glass transition temperature ($T_g$) for the core-shell polymer resin is between about 65° C. to about 125° C. and preferably between about 75° C. to about 120° C.

A preferred acrylic polymer resin for the invention is Kane Ace™ UC521, which is manufactured commercially by Kaneka.

Blocked Isocyanate Urethane Prepolymer

Polyurethanes are formed by the reaction of an isocyanate containing two or more isocyanates groups per molecule (R—(N═C═O)$_{n≥2}$) with a polyol containing two or more hydroxy groups per molecule (R'—(OH)$_{n≥2}$), in the presence of a catalyst.

Urethane prepolymers are reactive intermediaries of this reaction process that are capable of further reaction with polyols to form polyurethane. For the present invention, the urethane prepolymers have been grafted with blocked isocyanate groups. Blocked isocyanate urethane prepolymers are commercially available from Bayer, Uniroyal, Air Products, Dow, BASF, and Mitsui Chemicals.

Crosslinking Agent

The plastisol composition of the invention includes a crosslinking agent to react with the functionalized isocyanate groups on the acrylic polymer and the urethane prepolymer of the plastisol composition. Any multifunctional crosslinking agent that will react with isocyanate groups can be used in the present invention. Multifunctional means that there is more than one reaction site available on the crosslinking agent.

To increase the shelf-life of the plastisol, preferred are latent curative amines that do not react until it is subject to sufficient heat. An example of a latent curative amine is adipic dihydrazide (ADH), which is a symmetrical molecule with a C4 backbone and reactive group C═ONHNH$_2$.

At temperatures above about 100° C., preferably at above about 120° C., the isocyanate groups on the acrylic and urethane resins "unblock" to reveal the highly reactive isocyanate groups R—N═C═O, as shown for the acrylic polymer below.

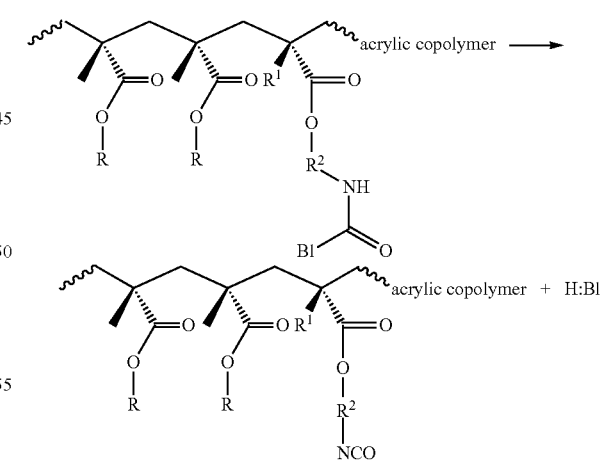

The unblocked isocyanate groups in the acrylic polymer and the urethane prepolymer react with a crosslinking agent, such as ADH, to form crosslinked networks. Because the ADH is multifunctional, it can serve to covalently graft the isocyanate group of an acrylic polymer segment to one reactive site, while covalently grafting the isocyanate group of a polyurethane segment to another reactive site. The result is the formation of a two-resin interpenetrating polymer network (IPN) having acrylic and urethane segments covalently bonded, as shown below.

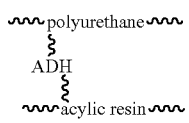

Plasticizer

The plasticizers for the plastisol composition can be selected from a wide number of plasticizers, based on the solubility of the plasticizer and the polymer resin. Specifically, for the solubility of a polymer resin "p" in a solvent (or plasticizer) "s", the absolute difference in solubility parameters $(\delta p - \delta s)^2$ should be as small as possible. However, if this value is too small, then the polymer resin and plasticizer will tend to fuse together too quickly i.e. the mixture will have poor storage stability. The ratio of the acrylic polymer resin and the urethane prepolymer to the plasticizer has a range from about 2:1 to about 1:3, or more preferred from a range of about 1:1 to about 1:3.

Preferred for the invention are plasticizers that are not restricted phthalates, including benzoate esters, polyadipates, citrates, alkylsulfonic acid phenyl esters, esters of 1,2-cyclohexane dicarboxylic acid, and combinations thereof. Particularly preferred is dioctyl terephthalate (DOTP), also referred to as bis(2-ethylhexyl)benzene-1,4-dicarboxylate, a diester of terephthalic acid and branched-chain 2-ethylhexanol, and which is not a restricted phthalate.

Thixotropic Agent

The plastisol ink composition (in particular, an underbase white ink that will be printed on a dark garment) needs to include a thixotropic agent, in order that the shear stress vs. shear rate curve of the plastisol used as an ink, (measured using e.g. a oscillatory frequency sweep at 25° C. with a cone and plate rheometer then data-transformed using the Cox-Merz Rule, or measured using a high shear extrusion viscometer as discussed in ASTM D1823) conforms approximately to a Herschel-Bulkley fluid $\tau = \tau_0 + K(\gamma)^n$ where $\tau$ is the shear stress, $\tau_o$ is the yield stress of about 500-100 Pa, K is the consistency of about 2000 Pa·s, $\gamma$ is the shear rate and n (exponential factor) is between about 0.5 and 0.9. In addition, it is important that the plastisol ink display a creep strain<0.05 when subjected to a static strain of 50 Pa in a creep test, using a cone and plate rheometer. When conforming to these requirements, the plastisol ink possesses a thick, buttery and "short" texture which allows for good printability, while at the same time producing printed images possessing good opacity and a soft, smooth "hand", a word used in the art to denote a comfortable haptic or feeling of the image on the textile when touched and manipulated in multiple and complex directions.

If no thixotropic agent is present in plastisol inks of the present invention, then the printed garment will have a rough "hand." The rough hand is caused by the unevenness of the surface deposit, primarily determined by surface roughness and coefficient of friction.

Thixotropic agent can contain castor oil derivative, high molecular weight polyolefin, attapulgite, montmorillonite clay, organo-clay, fumed silica, fibrated mineral, calcium sulphonate derivative, polyamide resin, polyester amide, alkyds, and oil-modified alkyd.

Preferably the thixotropic agent is fumed silica such as Acematt® TS 100 or Aerosil® 200, commercially available from Evonik Industries.

Additional Additives

A variety of additives known to those skilled in the art can be included in plastisol ink compositions of the present invention to increase processing or performance properties.

Non-limiting examples of additives include dispersants, lubricants, fillers, optical brighteners, puff matting agents, antioxidants, chemical and physical blowing agents, stabilizers, moisture scavengers, air release agents, oxidizers, reducers, surfactants, processing aids, and combinations thereof.

These additives are commercially available from a wide variety of sources and are very well known by those skilled in the art desiring formulations that mix and process well (lubricants, air release agents, etc.) as well as provide valuable performance properties (optical brighteners, puff matting agents, antioxidants, etc.)

Range of Ingredients

Table 1 shows acceptable, desirable, and preferred ranges of the following ingredients: blocked-isocyanate grafted acrylic polymer, blocked-isocyanate urethane prepolymer, crosslinking agent, plasticizers, pigment, filler, thixotropic agent, and optional additives. The invention can be based on a blend comprising these ingredients, consisting essentially of these ingredients, or consisting of these ingredients.

TABLE 1

| Range of Ingredients | | | |
|---|---|---|---|
| Ingredient (Wt. %) | Acceptable Range | Desirable Range | Preferable Range |
| Blocked-Isocyanate Grafted Acrylic Polymer | 10-50 | 20-40 | 25-35 |
| Blocked-Isocyanate Urethane Prepolymer | 10-50 | 20-40 | 25-35 |
| Plasticizer(s) | 50-75 | 40-65 | 45-60 |
| Crosslinking Agent | .5-5 | 1-5 | 2-4 |
| Pigment(s) | 0-40 | 1-35 | 1-30 |
| Thixotropic Agent | 0-10 | 1-7 | 2-5 |
| Additives | 0-40 | 5-30 | 10-20 |

Water is not used as a solvent for mixing the ingredients above; so the plastisol ink composition is essentially free of water. The presence of water is undesirable in the proposed invention, because water can react with the isocyanate groups on the pre-urethane polymer to form a urea linkage and carbon dioxide gas, resulting in a polyurethane foam. Water could also create voids and defects in the film as it evaporates during the oven cure process.

The variation of pigment concentration depends greatly on how much pigment is needed to achieve the desired color. Some intense fluorescent colors require multiple pigments in significant concentrations. Also, pigment concentration is dependent on the location of color within three-dimensional color-space, especially with respect to the lightness/darkness axis.

The variation in additive concentration depends on which additives are being added and for what purpose. Those skilled in the art would not require undue experimentation to develop a collection of preferred additives and their concentrations to achieve flowable plastisol inks useful in a variety of applications and industries.

Because of the necessity of intimately mixing particulates (resin(s), pigment(s), certain additives) into the plasticizer, it is preferable to apportion the amount of plasticizer for introduction into a mixing chamber at various times. More preferably, for economy of color generation as known to those skilled in the art, one can develop a masterbatch of base ingredients and then have a separate pigment concentrate(s) that are compatible with the masterbatch but do not require the inventory of having a full complement of colors of plastisol ink compositions, so long as the masterbatch can be mixed with a selected pigment concentrate at the appropriate time.

In respect of processing of plastisol ink compositions of the present invention, a feature of the invention is that the ingredients selected for the compositions unexpectedly provide very similar processing conditions for use by one skilled in the art of using polyvinyl halide plastisol ink compositions. Thus, it is very advantageous via the present invention to have an entirely new line of possible plastisol inks with virtually the same mechanics and techniques of use to make imaged graphics on textiles.

The method of preparing masterbatches and pigment concentrates are well known to those skilled in the art. The method of preparation of plastisol of this invention is identical to that of plastisol made from vinyl halides and restricted phthalate esters. For a plastisol ink of the present invention, it has been found that use of three-roll milling aids in reducing particle size of the particulates in the inks to improve delivery of the inks in the screen-printing process to the textile to be imaged.

Preferably, one can blend the blocked-isocyanate grafted acrylic polymer, blocked-isocyanate urethane prepolymer, plasticizers, fillers, pigments, and optional processing/performance aids together using a rotary mixer with jacketed cooling tub until the resulting mixture is homogeneous.

Then, in a second step, the mixture is de-agglomerated using a 3-roll mill, for a sufficient duration to ensure a Hegman fineness of grind value≥4. The crosslinking agent can be added before the roll-milling step, immediately after roll-milling or immediately prior to screen printing. The blocked-isocyanate urethane prepolymer can also be added with the crosslinking agent, instead of during the first step.

Thixotropic agents can be added in any of the above steps so as to achieve the final viscosity target.

Usefulness of the Invention

The resulting plastisol compositions are particularly suitable for the screen printing of textiles. When subjected to a thermal cure at temperatures of about 130° C. to about 170° C. for at least about 0.5 minutes, and preferably from about 1 to about 2 minutes, the isocyanate groups on the acrylic polymer and urethane prepolymer become unblocked and react with the crosslinking agent to produce a crosslinked acrylic-urethane interpenetrating polymer network plastisol with excellent toughness, storage stability, wash fastness and haptic (soft-hand) appeal.

Due to the use of blocked isocyanates, these plastisol compositions have the advantage being one-component systems (i.e. because the reaction can be controlled no crosslinking or other reactive agent must be added in separate step prior to cure) having good shelf life. Moreover, the covalent bonding between the acrylic polymer and polyurethane via crosslinking significantly improves the toughness of the plastisol and, correspondingly, its durability.

Plastisol ink compositions of the present invention provide comparable processing and performance as conventional plastisol inks containing polyvinyl halide resins and restricted phthalate plasticizers, but are essentially free of both of them. For example, one can use the same squeegees, ovens, cure temperatures, dwell times, screens, emulsions, and clean up techniques as those employed for polyvinyl chloride plastisol inks. In this respect, the inks of the present invention can be considered "drop-in replacements" for the conventional vinyl/restricted phthalate inks.

The viscosity of plastisol inks is acceptably from about 100,000 to about 1,600,000 centipoise, desirably from about 250,000 to about 1,400,000 cps and preferably from about 500,000 to about 1,300,000 centipoise, when measured at 2.5 revolutions per minute on a Brookfield LVT rheometer. The inks are printable via screen printing techniques, including without limitation, high speed automatic presses, manual printing, and high speed rotary printers.

Multiple plastisol inks can be used with different pigments in order to generate multi-colored image graphics according to techniques well known in the art. Further information about printing image graphics can be found at the website for Wilflex™ inks: wilflex.com.

It is an advantage of the invention that one can continue to use known techniques with new plastisol ink formulations that process and perform in an essentially like manner to conventional vinyl halide plastisol ink formulations. Thus, printers are not required to learn new techniques, yet the screen-printed image graphics are made from new plastisol ink formulations.

The viscosity of the plastisol compositions could also be modified by a person having ordinary skill in the art to meet the requirements of differing modes of application and usage. The plastisols of this invention can be processed using spin casting, slush molding, rotational molding, spray coating, or dip coating. Applications for plastisols processed using these methods include: UV protective coatings, anti-corrosion coatings for metals, coil coating, impregnating and coating substrates made from textile materials (e.g. carpet backing), floor coatings, solder masks, metal finishes, binders, adhesives, and sealants, sound insulation, shatter proofing glass coatings, tool grips, electrical insulation, and automotive underbody protection and interior components (e.g. crash pads, visors, arm rests, gear shift boots, etc.).

The Examples further demonstrate the utility of the invention.

EXAMPLES

General Experimental Materials Examples

Table 2 shows the list of ingredients for Comparative Examples A-G and Examples 1 and 2.

TABLE 2

| Brand Name | Ingredient | Purpose | Commercial Source |
|---|---|---|---|
| Dianal ® LP 3202 | Acrylic core-shell resin (Tg 84° C., acid value = 16.6 mg KOH/g determined by acid titration) | Base polymer resin | Dianal America |
| Kane Ace ™ UC521 | Blocked isocyanate grafted acrylic-core shell polymer | Base polymer resin | Kaneka |
| Takenate ® B-7030 | Blocked isocyanate urethane prepolymer | Base polymer resin | Mitsui Chemicals |
| Mesamoll ® | Alkylsulphonic acid ester with phenol (ASE) | Plasticizer | Laxness Deutschland GmbH |

TABLE 2-continued

| Brand Name | Ingredient | Purpose | Commercial Source |
|---|---|---|---|
| Eastman 168 ™ | Dioctyl terephthalate | Plasticizer | Eastman Chemical |
| Hallstar ® Dioplex ® 7017 | Polyester adipate | Plasticizer | Hallstar |
|  | Adipic dihydrazide (Amine equivalent weight = 87.1%) | Crosslinking agent | Tokyo Chemical Industry |
| Acematt ® TS 100 | Fumed Silica | Thixotropic agent | Evonik Industries |
| Expancel ® 920 DU-80 | Unexpanded microspheres (dry) | Thixotropic agent | AkzoNobel |
| Tiona ® RCL-4 | Hydrophobic organically-treated titanium dioxide | Inorganic white pigment | Millennium Chemicals |

The base polymer resin(s), plasticizer, color pigment and thixotropic agent were all combined in the first step (except for the blocked isocyanate urethane prepolymer in Examples 1-2, and Comparative Example E as noted below) by mixing in a KitchenAid stand mixer. The plasticizer for each example was selected based on its optimal solubility with the polymer base resin. The resulting blend was milled in a 3-roll mill, to achieve a Hegman Fineness of Grind (ASTM D1210) of approximately 6.

To this pre-blended mixture, the crosslinking agent was added for Comparative Examples B, D, E, and F, and Examples 1-2. No crosslinking agent was added to Comparative Examples A and C. In Examples 1-2, and Comparative Example E, the blocked isocyanate urethane prepolymer was added to the pre-blended mixture after milling.

The recipes for Comparative Examples A-G and Examples 1-2 by weight percent of the plastisol ink composition are in Table 3. Table 4 shows performance characteristics of the plastisol according to the tests described in the following section.

General Experimental Testing Procedures

The ball-burst penetration test was conducted on Comparative Examples A-F, and Example 1. The plastisol compositions of these examples were each drawn-down as a 10-mil film onto a smooth and flat Teflon sheet using a Multiple Clearance Square Applicator (Byk-Gardener). The films were cured for three minutes in an electrically heated oven set to 140° C. After cooling, the respective films were carefully peeled from the Teflon sheet, cut to size and clamped between two large steel washers (internal diameter=1.7 cm). The films were then subjected to a micro ball burst strength test, modeled on ASTM D3787-01, using a 0.8 cm polished steel ball to apply a controlled load (i.e. the peak force) at 90 degrees to the plastisol film, and having a constant rate of traverse=3 mm/min. The $\Delta$ strain was measured by the perpendicular distance traveled by the ball point from touching the plastisol film unstrained to the point of the plastisol film tearing. The modulus of toughness was calculated in millijoules (mJ) by multiplying the peak force (in Newtons) by the $\Delta$ strain (in millimeters). A summary of data from these tests, including the modulus of toughness, is provided in Table 4.

Storage stability and print screen testing for haptic appeal, opacity and wash fastness were performed on Comparative Example G and Example 2, which contained white pigment. The plastisol ink formulations for Comparative Example G and Example 2 were printed onto 100% black cotton tee-shirts (Gildan Heavy Cotton) using a Challenger II automatic screen printing press from M&R Company, equipped with 110 mesh screen in the design of a large number "8". The print procedure was as follows: the shirts were printed once using a double squeegee stroke, flashed dried under a quartz heater (Red Chili from M&R Co.) for 8 sec, 180° C., and then reprinted using a double stroke. The shirts were removed from the pallet, and then fully cured in a 12-foot gas-fired conveyor dryer (M&R Sprint series) set to 160° C. and a belt speed of 6 feet/min. After cure, the shirts were inspected for haptic appeal and opacity of the prints. The haptic "hand" properties of the printed swatches were determined subjectively by feeling the swatch for roughness and any tackiness (i.e. stickiness) of the printed ink.

Then, the shirts printed with the plastisol inks of Comparative Example G and Example 2 were laundered using a Miele PT 7136 Plus wash machine set to a water temperature of 60° C. and a spin velocity of 1000 rpm, and a Miele PW 6065 Plus drier, set to the "cotton" cycle. The laundry detergent used was Tide® Ultra (Proctor & Gamble, Cincinnati, Ohio). After 5 laundry cycles, the shirts were examined for cracking and loss of adhesion using optical microscopy.

To test for ink stability, Comparative Example G and Example 2 were aged in an oven at 46° C. (114.8° F.) for 5 days. The initial and aged viscosity was determined on an AR2000ex rheometer (TA instruments), using 20 mm parallel-plate geometry under flow conditions at a shear rate of 1 sec$^{-1}$ and a temperature of 25° C. A summary of the results for haptic appeal, opacity, wash fastness and storage stability is provided in Table 5.

TABLE 3

| Ingredients | Example | | | | | | | | |
|---|---|---|---|---|---|---|---|---|---|
|  | A | B | C | D | E | F | G | 1 | 2 |
| Blocked isocyanate grafted acrylic core-shell polymer | 38.46% | 37.42% |  |  |  |  | 29.07% | 31.18% | 23.60% |
| Acid-functionalized core-shell acrylic resin |  |  | 38.46% | 37.42% | 31.18% |  |  |  |  |
| Polyester adipate plasticizer | 37.50% | 36.48% |  |  |  |  | 28.34% | 30.40% | 23.00% |
| Dioctyl terephthalate plasticizer | 20.19% | 19.64% |  |  |  |  | 15.26% | 16.37% | 12.38% |
| Alkyl-sulphonic acid ester with phenol plasticizer |  |  | 57.69% | 56.13% | 46.77% |  |  |  |  |
| Urethane prepolymer w/ blocked isocyanate functional groups |  |  |  |  | 15.59% | 88.11% |  | 15.59% | 11.80% |

TABLE 3-continued

| Ingredients | Example | | | | | | | | |
|---|---|---|---|---|---|---|---|---|---|
| | A | B | C | D | E | F | G | 1 | 2 |
| Latent curative | | 2.71% | | 2.71% | 3.35% | 3.08% | | 3.35% | 2.54% |
| Hydrophobic organically-treated titanium dioxide | | | | | | | 23.84% | | 23.88% |
| Fumed silica | 3.85% | 3.74% | 3.85% | 3.74% | 3.12% | 8.81% | 2.90% | 3.12% | 2.35% |
| Unexpanded microspheres | | | | | | | 0.58% | | 0.47% |
| Total | 100% | 100% | 100% | 100% | 100% | 100% | 100% | 100% | 100% |

TABLE 4

| Property | Units | Example | | | | | | |
|---|---|---|---|---|---|---|---|---|
| | | A | B | C | D | E | F | 1 |
| Peak force | N | 2.97 | 3.52 | 2.83 | 3.11 | 4.50 | 10.91 | 7.63 |
| Δ strain | Mm | 23.25 | 21.50 | 20.00 | 21.75 | 16.25 | 23.50 | 27.75 |
| Modulus of Toughness | N * mm (mJ) | 27.06 | 37.60 | 24.85 | 33.62 | 30.54 | 98.23 | 77.56 |

TABLE 5

| Property | Comparative Example G | Example 2 |
|---|---|---|
| Haptic appeal (subjective hand feel) | Slightly sticky, tacky. | Smooth, soft and dry. No tack or stickiness |
| Opacity | Excellent | Excellent |
| Storage Stability, accelerated aging test (7 days at 46° C.); η(5 days)/η(initial) | Good: η(5 days)/η(initial) = 2.5 | Excellent: η(5 days)/η(initial) = 1.7 |
| Wash fastness, 5 cycles | Poor: film cracking and surface abrasion | Excellent: no cracking, with minor roughening of the surface |

Performance Results

Comparative Example A demonstrated that the plastisol of the blocked isocyanate grafted acrylic core-shell polymer, without the use of any crosslinking agent, has a very poor modulus of toughness (i.e. less than 30 mJ). When a crosslinking agent was added to the blocked isocyanate grafted acrylic core-shell polymer in Comparative Example B, the cured plastisol composition showed an improved toughness modulus.

Comparative Examples C and D replaced the isocyanate grafted acrylic core-shell polymer with an acid-functionalized core-shell acrylic resin. Again, no crosslinking agent was added to Comparative Example C, whereas Comparative Example D included a crosslinking agent. Similar to the previous examples, the cured plastisol of Comparative Example C had very poor modulus of toughness, and the cured plastisol of Comparative Example D had a comparatively better modulus of toughness.

Because polyurethane is known in the art for its toughness as a result of the crosslinking when cured, in Comparative Example F the acrylic polymer was replaced by a urethane prepolymer with blocked isocyanate groups and crosslinking agent. The result was a cured plastisol having a very high modulus of toughness. Comparative Example E then included both an acid-functionalized core-shell acrylic resin and a blocked isocyanate urethane prepolymer with a crosslinking agent. Surprisingly, the cured plastisol of Comparative Example E demonstrated a very poor modulus of toughness, which was even lower than the crosslinked acid-functionalized core-shell acrylic polymer alone (i.e. Comparative Example D).

Example 1 substituted the acid-functionalized core-shell acrylic resin of Comparative Example E with a blocked isocyanate grafted acrylic core-shell polymer, which was then blended together with a blocked isocyanate urethane prepolymer. In contrast to Comparative Example E, Example 1 unpredictably demonstrated a high modulus of toughness similar to the toughness of the cured urethane composition of Comparative Example F.

These examples demonstrate that the covalent bonds formed by crosslinking generally increase the modulus of toughness for the cured acrylic polymer plastisols compared to the uncrosslinked acrylic polymer plastisols. However, in Comparative Example E, the two-resin plastisol of a blocked isocyanate urethane prepolymer and an acid functionalized core-shell acrylic still resulted in a lower modulus of toughness. This poor toughness is likely the result of the plastisol forming separate interpenetrating polymer networks (or domains)—one domain formed by the acrylic polymer and another domain formed by the polyurethane—which causes the cured plastisol of the heterogeneous composition to be weaker than a homogenous composition of either of the respective polymer resins alone.

Unexpectedly, the cured plastisol of urethane prepolymer with blocked isocyanate groups and isocyanate grafted core-shell acrylic polymer for Example 1 had a high modulus of toughness of more than 2× the toughness of the crosslinked isocyanate grafted acrylic core-shell polymer alone (i.e. Comparative Example B). The excellent modulus of toughness for Example 1 indicates there is crosslinking between the polyurethane and acrylic polymer segments, forming an acrylic-polyurethane interpenetrating polymer network.

In Example 2, a formulation similar to Example 1 also containing additional additives and white pigment, was used as a screen printing ink plastisol. In comparison, Comparative Example G contained isocyanate grafted acrylic core-shell polymer with no crosslinking agent or urethane prepolymer. Although both plastisol formulations had excellent opacity for screen printing, Comparative Example G had a less desirable haptic appeal being slightly sticky and tacky versus the smoothness and dryness of Example 2. Furthermore, Example 2 showed improved storage stability and much improved wash fastness compared to Comparative Example G. Therefore, the acrylic-polyurethane interpenetrating polymer network of Example 2 resulted in greater stability of the plastisol, as well as an improved haptic appeal and wash fastness compared to the uncrosslinked isocyanate grafted acrylic core-shell polymer.

For Examples 1 and 2, the isocyanate groups of the urethane prepolymer and acrylic resin would have the same relative reaction rate with the amine of the adipic dihydrazide; so the crosslinking reactions on the acrylic polymer and urethane prepolymer would occur simultaneously. The relative reaction rate for the isocyanate (based on an uncatalyzed reaction rate at 80° C.) is 100,000 with the aliphatic amine of the adipic dihydrazide and between about 20,000 to about 50,000 with a secondary aliphatic amine of the adipic dihydrazide according to the *Handbook of Adhesive Technology*, $2^{nd}$ Edition, edited by A. Pizzi, K. L. Mittal, CRC Press, 2003. p. 699.

On the other hand, the reaction between a primary hydroxyl group and an amine is only 100, according to the *Handbook of Adhesive Technology* for an uncatalyzed reaction rate at 80° C., which would represent the relative reaction rate of the acid-functionalized core-shell acrylic polymer. As a result the acid functionalized core-shell acrylic polymer would take longer to react with the crosslinking agent compared to the urethane prepolymer.

In the Examples it is likely that the although the urethane prepolymer isocyanate groups of Comparative Example E formed crosslinks with adipic dihydrazide, the acid-functionalized core-shell acrylic polymer did not have time under normal screen printing curing conditions to form similar crosslinkages with adipic dihydrazide, thus resulting in separate polymer domains that lead to a weaker cured composition. So, the functional groups of the acrylic polymer and urethane prepolymer are preferably the same or have similar relative reaction rates with the crosslinking agent selected.

The invention is not limited to the above embodiments. The claims follow.

What is claimed is:

1. A plastisol composition, comprising:
   (a) acrylic polymer;
   (b) urethane prepolymer;
   (c) plasticizer;
   (d) crosslinking agent;
   (e) optionally a thixotropic agent; and
   (f) optionally a pigment;
   wherein the crosslinking agent is multifunctional, and wherein the acrylic polymer and urethane prepolymer contain blocked isocyanate groups that become unblocked when subjected to heat and react with the crosslinking agent to form an interpenetrating acrylic-polyurethane network.

2. The plastisol composition of claim 1, wherein the acrylic polymer is a core-shell acrylic polymer.

3. The plastisol composition of claim 2, wherein the core-shell acrylic polymer has a glass transition temperature of between about 65° C. to about 125° C.

4. The plastisol composition of claim 1, wherein the isocyanate content of the acrylic polymer is about 0.02% to about 10.0% by weight.

5. The plastisol composition of claim 1, wherein the crosslinking agent is a latent amine curative.

6. The plastisol composition of claim 1, wherein the blocked isocyanate groups of the acrylic polymer and the urethane prepolymer become unblocked when subjected to a thermal cure at temperatures of about 130° C. to about 170° C.

7. The plastisol composition of claim 1, wherein the composition is essentially free of polyvinyl halides and restricted phthalates.

8. The plastisol composition of claim 1, wherein the plasticizer is selected from the group consisting of dioctyl terephthalate, benzoate esters, polyadipates, citrates, alkylsulfonic acid phenyl esters, esters of 1,2-cyclohexane dicarboxylic acid, and combinations thereof.

9. The plastisol composition of claim 1, wherein the thixotropic agent contains at least one of the following: castor oil derivative, high molecular weight polyolefin, attapulgite, montmorillonite clay, organo-clay, fumed silica, fibrated mineral, calcium sulphonate derivative, polyamide resin, polyester amide, alkyds, or oil-modified alkyd.

10. The plastisol composition of claim 1, wherein the additional additives are selected from the group consisting of lubricants, dispersants, fillers, optical brighteners, puff matting agents, antioxidants, chemical and physical blowing agents, stabilizers, moisture scavengers, air release agents, oxidizers, reducers, surfactants, processing aids, and combinations thereof.

11. The plastisol composition of claim 1, wherein the composition in weight percent comprises:
   (a) the acrylic polymer in the range of 10 to 50%;
   (b) the urethane prepolymer in the range of 10 to 50%;
   (c) the plasticizer in the range of 50 to 75%;
   (d) the crosslinking agent in the range 0.5 to 5%;
   (e) the pigment in the range of 0 to 40%;
   (f) the thixotropic agent in the range of 0 to 10%; and
   (g) an additive in the range of 0 to 40%.

12. The plastisol composition of claim 1, wherein the ratio of the acrylic polymer resin and the urethane prepolymer to the plasticizer is in the range from about 2:1 to about 1:3.

13. The plastisol composition of claim 1, wherein the ratio of the acrylic polymer resin to the urethane prepolymer is in the range from about 1:1 to about 4:1.

14. A method of making the plastisol composition of claim 1, comprising the steps of:
   (a) blending, into a mixture, blocked isocyanate grafted acrylic polymer, plasticizer, and optionally the pigment together using a rotary mixer with jacketed cooling tub until the mixture is homogeneous;
   (b) de-agglomerating the mixture using a 3-roll mill, for a sufficient duration to ensure a Hegman fineness of grind value ≥4; and
   (c) adding crosslinking agent
   wherein the urethane prepolymer with blocked isocyanate functional groups is added during step (a) or step (c); and
   wherein optionally the thixotropic agent is added during any of the above steps to achieve the desired viscosity target.

15. The method of claim 14, wherein the plastisol composition is cured by (d) heating the plastisol composition to unblock the isocyanate groups on the acrylic polymer and the urethane prepolymer so that the isocyanate groups will react with the crosslinking agent to form an interpenetrating acrylic-polyurethane network.

16. The method of claim 15, wherein the plastisol composition is heated in step (d) at temperatures of about 130° C. to about 170° C. for at least about 0.5 minutes.

17. A printed textile article comprising a textile article having an image graphic printed thereon from the plastisol composition of claim 1.

18. The printed textile article according to claim 17, wherein the textile article is a garment and wherein the image graphic from the plastisol composition is applied by a screen-printing technique.

19. A coated article, comprising a substrate wherein the coating consists of the plastisol composition of claim 1.

20. The coated article of claim 19 wherein the coating of the article has been applied by spin casting, slush molding, rotational molding, spray coating, or dip coating.

* * * * *